United States Patent
Kitamura et al.

(10) Patent No.: US 7,416,592 B2
(45) Date of Patent: Aug. 26, 2008

(54) MAGENTA INK COMPOSITION, INK SET, INK CARTRIDGE, INKJET RECORDING METHOD AND RECORDED PRODUCT

(75) Inventors: Kazuhiko Kitamura, Matsumoto (JP); Hiroshi Fukumoto, Shiojiri (JP); Akihito Sao, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/747,252

(22) Filed: May 11, 2007

(65) Prior Publication Data

US 2007/0263055 A1 Nov. 15, 2007

(30) Foreign Application Priority Data

May 12, 2006 (JP) .............................. 2006-133854

(51) Int. Cl.
C09D 11/00 (2006.01)
C09D 11/02 (2006.01)
B41J 2/01 (2006.01)

(52) U.S. Cl. .............. 106/31.47; 106/31.48; 106/31.43; 106/31.58; 106/31.59; 347/100

(58) Field of Classification Search .............. 106/31.48, 106/31.47, 31.77, 31.43, 31.75, 31.58, 31.86, 106/31.59, 31.89; 347/100
See application file for complete search history.

(56) References Cited

U.S. PATENT DOCUMENTS 6,852,154 B2 * 2/2005 Kitamura et al. ......... 106/31.47

(Continued)

FOREIGN PATENT DOCUMENTS

JP 2000-290559 10/2000

(Continued)

OTHER PUBLICATIONS

Abstract of JP 2003/231835; Aug. 2003.*

(Continued)

*Primary Examiner*—Helene Klemanski
(74) *Attorney, Agent, or Firm*—Ladas & Parry LLP

(57) ABSTRACT

A magenta ink composition used as a colorant, containing at least one type of compound represented by Formula (I) below and at least one type of compound represented by Formula (II) below:

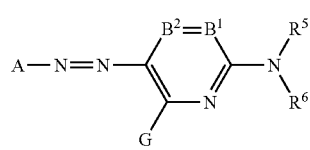

(I)

(wherein A represents the residue of the five member heterocyclic diazo moiety A-NH$_2$; B$^1$ and B$^2$ represent —CR$^1$= and —CR$^2$=, or one represents a nitrogen atom, and the other represents —CR$^1$= or —CR$^2$=; R$^5$ and R$^6$ each independently represents a hydrogen atom, aliphatic group, aromatic group, heterocyclic group, acyl group, alkoxy carbonyl group, aryloxy carbonyl group, carbamoyl group, alkyl sulfonyl group, aryl sulfonyl group, or sulfamoyl group, each group therein being optionally substituted; G, R$^1$ and R$^2$ each independently represents a hydrogen atom, halogen atom, aliphatic group, aromatic group, heterocyclic group, cyano group, carboxyl group, carbamoyl group, alkoxycarbonyl group, aryloxy carbonyl group, acyl group, hydroxyl group, alkoxy group, aryloxy group, silyloxy group, acyloxy group, carbamoyloxy group, heterooxy group, alkoxycarbonyloxy group, aryloxycarbonyloxy group, amino group substituted with an alkyl group or aryl group or heterocyclic group, acylamino group, ureide group, sulfamoylamino group, alkoxycarbonylamino group, aryloxycarbonylamino group, alkyl and aryl sulphonylamino group, aryloxycarbonylamino group, nitro group, alkyl and aryl thio group, alkyl and aryl sulfonyl group, alkyl and aryl sulfinyl group, sulfamoyl group, sulfo group, or heterothio group, each group therein being optionally substituted; and R$^1$ and R$^5$, or R$^1$ and R$^5$ may optionally bond together to form a 5 or 6 member ring);

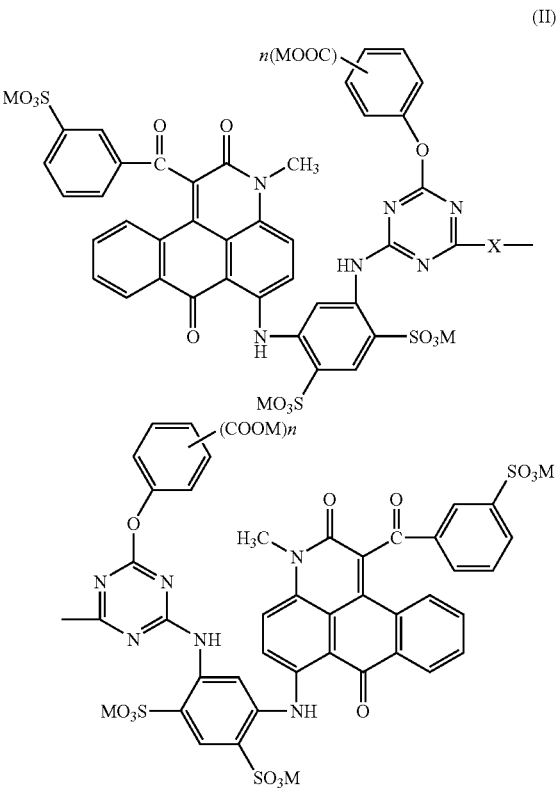

(II)

(wherein M represents a hydrogen atom, ammonium group, or alkali metal atom; X represents a diaminoalkylene group; and n represents either 1 or 2).

31 Claims, No Drawings

U.S. PATENT DOCUMENTS

| | | | |
|---|---|---|---|
| 6,929,361 B2 * | 8/2005 | Matsumoto et al. | 106/31.47 |
| 6,984,032 B2 * | 1/2006 | Kitamura et al. | 106/31.47 |
| 7,015,327 B2 * | 3/2006 | Matsumoto et al. | 546/76 |
| 7,211,132 B2 * | 5/2007 | Oki et al. | 106/31.47 |
| 2005/0115459 A1 * | 6/2005 | Hanmura et al. | 106/31.47 |
| 2006/0009357 A1 | 1/2006 | Fujiwara et al. | |

FOREIGN PATENT DOCUMENTS

| | | |
|---|---|---|
| JP | 2001-288392 | 10/2001 |
| JP | 2002-332419 | 11/2002 |
| JP | 2002-371079 | 12/2002 |
| JP | 2004-315739 | 11/2004 |
| JP | 2005-105136 | 4/2005 |
| WO | 2006/075706 | 7/2006 |

OTHER PUBLICATIONS

English translation of JP 2003/231835; Aug. 2003.*
Derwent abstract of JP 2005/105136; Sep. 2003.*
Patent Abstract of Japan of JP 2000-290559 Dated Oct. 17, 2000.
Patent Abstract of Japan of JP 2001-288392 Dated Oct. 16, 2001.
Patent Abstract of Japan of JP2002-371079 Dated Dec. 26, 2002.
Patent Abstract of Japan of JP 2002-332419 Dated Nov. 22, 2002.
Patent Abstract of Japan of JP 2005-105136 Dated Apr. 21, 2005.
Patent Abstract of Japan of JP 2004-315739 Dated Nov. 11, 2004.

* cited by examiner

MAGENTA INK COMPOSITION, INK SET, INK CARTRIDGE, INKJET RECORDING METHOD AND RECORDED PRODUCT

BACKGROUND

1. Technical Field

The present invention relates to a magenta ink composition (including both a dark magenta ink composition and a light magenta ink composition) suitable for an inkjet recording method that has not only excellent print quality and stable ejection reliability wherein foaming is suppressed, but also makes it possible to obtain inkjet recorded product with excellent resistance to moisture, ozone, and light; an ink set and ink cartridge using the aforementioned magenta ink composition; and an inkjet recording method and recorded product utilizing the same.

2. Related Art

The inkjet recording method is a publicly known method wherein droplets of an ink composition are ejected from a fine nozzle, deposited on the surface of a recording medium, and letters and images are recorded thereby. Inkjet recording methods that have reached practical application include (i) a method wherein an electric signal is converted to a mechanical signal using a piezoelectric element, an ink composition stored in the nozzle head member is ejected intermittently therefrom in accordance with the mechanical signal, the ink composition is deposited on the surface of a recording medium, and letters and images are recorded thereby, and (ii) a method wherein a part very close to the ejection member of the nozzle head is rapidly heated, a bubble is generated in the ink composition stored in the nozzle head member, the ink composition is ejected intermittently therefrom due to the expansion in volume of the bubble, the ink composition is deposited on the surface of the recording medium, and letters and images are recorded thereby.

Recently a plurality of color ink compositions have been prepared, and color images using inkjet recording have been formed thereby. Generally speaking, the forming of a color image is accomplished with three colors involving a yellow ink composition, magenta ink composition, and cyan ink composition, and in some cases with four colors wherein a black ink composition is added thereto. Additionally, color images are sometimes formed with six colors wherein a light cyan ink composition and a light magenta ink composition are added to the aforementioned four colors, or even with seven colors wherein a dark yellow ink composition is added thereto. Such a combination of two or more ink compositions is called an ink set, and normally an ink set is used in the form of an ink cartridge containing the same that is installed in a printer.

It is desirable that the ink compositions used in the inkjet recording method are generally liquids wherein various dyes are dissolved in water, an organic solvent, or a liquid mixture thereof, and the ink compositions used in forming such color images not only have excellent color themselves, but exhibit excellent intermediate color when combined with a plurality of ink compositions, and do not discolor over time when matter printed thereby is stored.

Due to continuous improvements in printing heads, ink compositions, recording methods and recording media the printing of photographic images by color inkjet printers has recently become comparable to that of silver salt photography, and the image quality thereof is on the same level as that of a photograph. On the other hand, improvements in the storage properties of images obtained thereby have been sought through refinements in ink compositions and media. Resistance to light in particular has been improved to a level whereby it presents no practical problem (see JP-A-2000-290559, JP-A-2001-288392). Still, resistance to light has not reached the same level as that of silver salt photography. The standard for evaluating light resistance capability has been to make a judgment using the discoloration rate of a pattern of pure colors (optical density near 1.0) consisting of Y (yellow), M (magenta) and C (cyan). When the light resistance capabilities of ink compositions used in printers that are currently on the market are evaluated using the above criteria, the magenta ink compositions score lowest and in many cases are the rate-limiting factor of the light resistance life of an ink set. As a result, improvement of the light resistance properties of a magenta ink composition will be effective in enhancing the light resistance of photographic images and prolonging the light resistance life of the ink set.

However, because printed matter prepared using the aforementioned ink compositions are placed not only indoors, but also outdoors, they are exposed to a variety of light sources including sunlight and to the atmosphere (ozone, NOx, SOx, etc.), and therefore ink compositions with excellent light resistance and gas resistance are being developed. The properties of light resistance and gas resistance are largely determined by the colorant used in the ink, and the development of a magenta ink composition with excellent moisture resistance in addition to these properties is needed.

Among the above properties, the compound of JP-A-2002-371079 (azo dye) and the compound of JP-A-2002-332419 (anthrapyridone dye) have been proposed as colorants with excellent light resistance and gas resistance. A magenta ink composition with excellent light resistance and gas resistance comprising a combination of two colorants has also been proposed (JP-A-2005-105136).

It has become possible to obtain an image without graininess using an ink set comprising the above light magenta ink composition by providing therewith two types of magenta ink compositions having different color densities. With these kinds of ink sets comprising two types of ink compositions having different color densities, the primary purpose thereof being the printing of photographic images, ink compositions with low color densities are generally used in the formation of photographic images to diminish or eliminate graininess. Furthermore, in the evaluation of light resistance noted above, a pattern with an optical density near 1.0 is formed using ink compositions with low color density. As a result, an improvement in light resistance of a light magenta ink composition can be linked to enhancing the light resistance of photographic images and prolonging the light resistance life of the ink set. In comparison with an ink composition having high color density, an ink composition having low color density does not require such strong chromogenicity, and other properties such as light resistance and the like become important.

As noted above, the ink compositions used in the inkjet printing method are mainly solutions wherein various dyes are dissolved in water, an organic solvent, or a liquid mixture thereof, and various surfactants and additives are added thereto for the purpose of improving the properties of the ink and increasing print quality and storage life of the printed matter. However, some of these surfactants and additives have high foamability despite their great effectiveness in improving ink composition properties, and an ink composition has been proposed wherein a specific defoaming agent and the like is combined therewith (see JP-A-2004-315739).

SUMMARY

The present invention provides a magenta ink composition (including both a dark magenta ink composition and a light magenta ink composition) suitable for an inkjet recording method that solves the above problems, has excellent print quality, has excellent fastness of the colorant on printed matter, enables inkjet recorded matter with excellent resistance to moisture, ozone, and light to be obtained, and has stable ejection reliability wherein foaming is suppressed; an ink set and ink cartridge using the aforementioned magenta ink composition; and an inkjet recording method and recorded matter utilizing the same.

The inventors investigated in detail colorants for inks used in inkjet recording, and additives for improving the properties thereof, and as a result they discovered that by using a combination of colorants with specific structures, an ink composition with excellent light resistance and ozone resistance, and also good moisture resistance could be obtained, and by the addition of a specific surfactant, additional effects such as increased moisture resistance and increased fixation of the ink on the recorded matter could be obtained, thus enabling the aforementioned problems to be solved by adopting the constituent elements described below.

(1) A magenta ink composition used as a colorant, containing at least one type of compound represented by Formula (I) below and at least one type of compound represented by Formula (II) below:

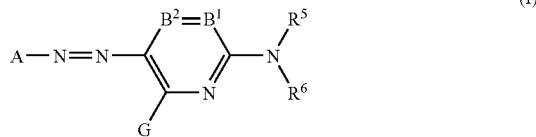

(wherein A represents the residue of the five member heterocyclic diazo moiety A-NH$_2$; B$^1$ and B$^2$ represent —CR$^1$═ and —CR$^2$═, or one represents a nitrogen atom, and the other represents —CR$^1$═ or —CR$^2$═; R$^5$ and R$^6$ each independently represents a hydrogen atom, aliphatic group, aromatic group, heterocyclic group, acyl group, alkoxy carbonyl group, aryloxy carbonyl group, carbamoyl group, alkyl sulfonyl group, aryl sulfonyl group, or sulfamoyl group, each group therein being optionally substituted; G, R$^1$ and R$^2$ each independently represents a hydrogen atom, halogen atom, aliphatic group, aromatic group, heterocyclic group, cyano group, carboxyl group, carbamoyl group, alkoxycarbonyl group, aryloxy carbonyl group, acyl group, hydroxyl group, alkoxy group, aryloxy group, silyloxy group, acyloxy group, carbamoyloxy group, heterooxy group, alkoxycarbonyloxy group, aryloxycarbonyloxy group, amino group substituted with an alkyl group or aryl group or heterocyclic group, acylamino group, ureide group, sulfamoylamino group, alkoxycarbonylamino group, aryloxycarbonylamino group, alkyl and aryl sulphonylamino group, aryloxycarbonylamino group, nitro group, alkyl and aryl thio group, alkyl and aryl sulfonyl group, alkyl and aryl sulfinyl group, sulfamoyl group, sulfo group, or heterothio group, each group therein being optionally substituted; and R$^1$ and R$^5$, or R$^5$ and R$^6$ may optionally bond together to form a 5 or 6 member ring);

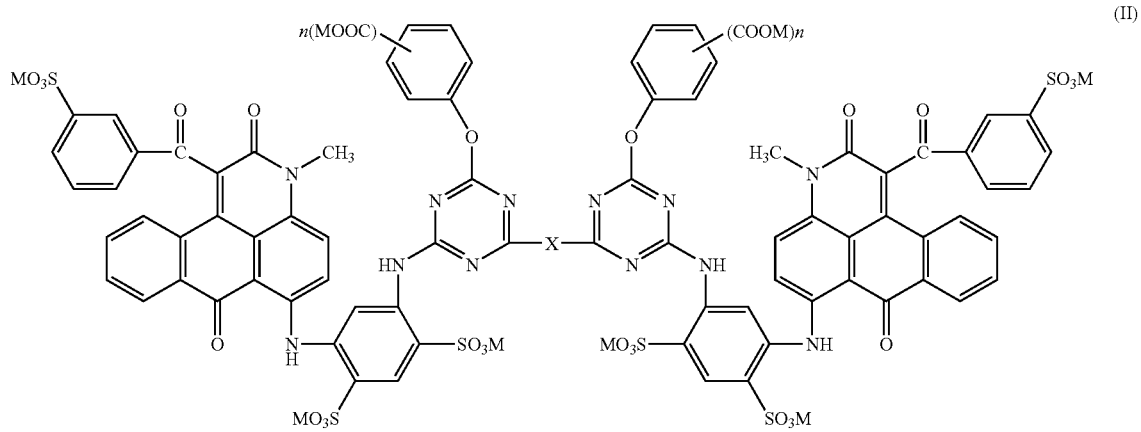

(wherein M represents a hydrogen atom, ammonium group, or alkali metal atom; X represents a diaminoalkylene group; and n represents either 1 or 2). (2) The magenta ink composition according to (1), wherein the compound represented by Formula (I) is the compound represented by Formula (III) below:

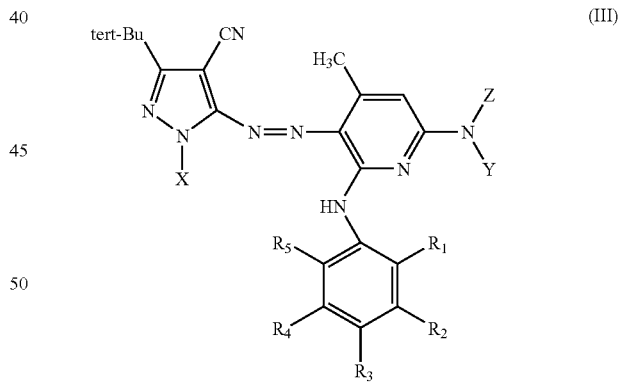

(wherein R$_1$ to R$_5$ represent a hydrogen atom, alkyl group, or a sulfo group or salt thereof; and independently R$_1$ and R$_5$ may be optionally substituted provided both are alkyl groups and the total number of carbon atoms constituting those alkyl groups is 3 or more).

(3) The magenta ink composition according to (2), wherein the compound represented by Formula (III) is the compound represented by Formula (IV) below:

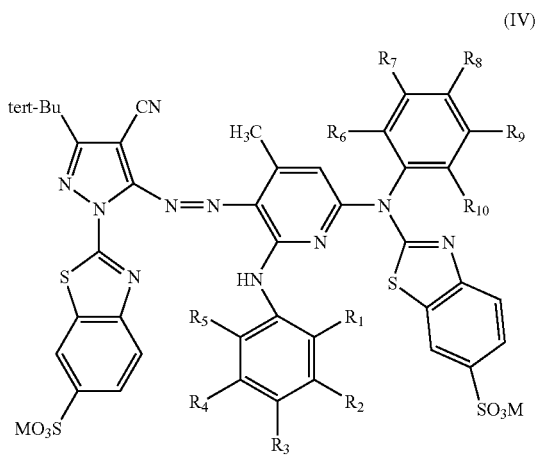

(wherein $R_1$ to $R_{10}$ represent a hydrogen atom, alkyl group, or a sulfo group or salt thereof; independently ($R_1$ and $R_5$) and ($R_6$ and $R_{10}$) may be optionally substituted provided both are alkyl groups and the total number of carbon atoms constituting those alkyl groups is 3 or more; and M represents a hydrogen atom or alkaline metal atom).

(4) The magenta ink composition according to any of (1) to (3), wherein the value of n in Formula (II) is 2.

(5) The magenta ink composition according to any of (1) to (4) containing therein 0.2 to 2.5 wt % of at least one type of compound represented by Formula (I) and 0.4 to 7.0 wt % of at least one type of compound represented by Formula (II), with respect to the total weight of the ink composition.

(6) The magenta ink composition according to any of (1) to (5), wherein the total weight of colorant solids is 0.6 to 8.0 wt % with respect to the total weight of the ink composition.

(7) The magenta ink composition according to any of (1) to (6), wherein the content ratio of the compound represented by Formula (I) to the compound represented by Formula (II) lies within the range of 2:1 to 1:8 by weight.

(8) The magenta ink composition according to any of (1) to (7) containing therein a betaine surfactant represented by Formula (V) below:

(wherein R represents a hydrogen atom, alkyl group, aryl group, or heterocyclic group; L represents a linking group with a valence of 2 or more; M represents a hydrogen atom, alkali metal atom, ammonium group, protonated organic amine or nitrogen-containing heterocyclic group, or a quaternary ammonium ion group, and if serving as a counter ion of an ammonium ion comprising atom N in Formula (V), it represents a group that does not serve as the cation thereof; q represents an integer of 1 or more, and r represents an integer of 1 or more but no greater than 4; p represents an integer of 0 or more but no greater than 4, and p+r is either 3 or 4; if p+r is 4, N is a nitrogen atom constituting a quaternary amine; and when p is 2 or more, R may be either the same or different; when q is 2 or more, COOM may be either the same or different; and when r is 2 or more, L-(COOM)$_q$ may be the same or different).

(9) The magenta ink composition according to (8), wherein the betaine surfactant represented by Formula (V) is the compound represented by Formula (VI) below:

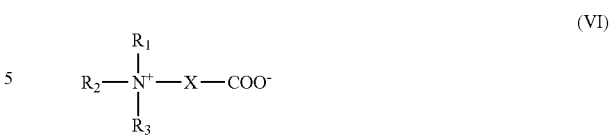

(wherein $R_1$ to $R_3$ each represents an alkyl group of 1 to 20 carbons; and X represents a linking group with a valence of 2).

(10) The magenta ink composition according to (9), wherein the compound represented by Formula (VI) is the compound represented by Formula (VII) below.

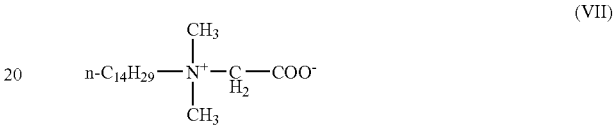

(11) The magenta ink composition according to any of (8) to (10), wherein the content ratio of the compound represented by Formula (I) to the betaine surfactant represented by Formula (V) lies within the range of 1:3 to 3:1 by weight.

(12) The magenta ink composition according to any of (8) to (11) containing therein a defoaming agent.

(13) The magenta ink composition according to (12), wherein the defoaming agent is an aliphatic diol compound of 4 to 6 carbons with a hydroxyl number of 1 to 2.

(14) The magenta ink composition according to (13), wherein the defoaming agent is a diacetylene tetraol compound.

(15) The magenta ink composition of any of (12) to (14), wherein the content ratio of the defoaming agent to the betaine surfactant represented by Formula (V) lies within the range of 1:10 to 4:1 by weight.

(16) The magenta ink composition according to any of (1) to (15) containing therein at least one aromatic compound or salt thereof having a carboxyl group.

(17) The magenta ink composition according to (16), wherein the aromatic compound or salt thereof containing a carboxyl group is a compound having a naphthalene skeleton or salt thereof.

(18) The magenta ink composition according to (16) or (17), wherein the content ratio of the compound represented by Formula (I), to the aromatic compound or salt thereof having a carboxyl group, lies within the range of 5:1 to 1:3 by weight.

(19) The magenta ink composition according to any of (1) to (18) containing therein a urea derivative.

(20) The magenta ink composition according to (19), wherein the urea derivative is one type or a mixture of two or more types selected from a group consisting of urea, allylurea, dimethylolurea, malonylurea, carbamylurea, n-butylurea, dibutylurea, N,N-dimethylurea, 1,3-dimethylurea, N-methylurea, hydroxyurea, ethylurea, methylurea, creatinine, 2-imidazolidinone, benzylurea, (R)-(+)-1-phenylethyl urea, phenylurea, 3-hydroxyphenylurea, 1-phenyl semicarbazide, 4-phenyl semicarbazide, N-benzoylurea, and N,N'—O-phenylurea.

(21) The magenta ink composition according to (19) or (20) containing therein 0.5 to 20 wt % urea derivative with respect to the total weight of the ink composition.

(22) The magenta ink composition according to any of (19) to (21), wherein the content ratio of the total weight of the compound represented by Formula (I) and the compound represented by Formula (II), to the urea derivative lies within the range of 5:1 to 1:100 by weight or, in another embodiment, within the range of 5:1 to 1:10 by weight.

(23) The magenta ink composition according to any of (1) to (22) containing therein a nonionic surfactant.

(24) The magenta ink composition according to (23), wherein the nonionic surfactant is an acetylene glycol surfactant.

(25) The magenta ink composition according to (23) or (24) containing therein 0.1 to 5.0 wt % nonionic surfactant with respect to the total weight of the ink composition.

(26) The magenta ink composition according to (1) to (25) containing therein a penetration enhancer.

(27) The magenta ink composition according to (26), wherein the penetration enhancer is a glycol ether.

(28) An ink set used in an inkjet recording method and containing therein at least the magenta ink composition according to (1) to (27) as a constitutional element thereof.

(29) An ink cartridge accommodating therein either integrally or independently the ink set according to (28).

(30) An inkjet recording method for performing recording by ejection of liquid droplets of an ink composition and depositing the same on a recording medium wherein recording is performed using the ink set according to (28), or the ink cartridge according to (29).

(31) Recorded matter printed by the inkjet recording method according to (30).

The ink composition of the present invention combining the colorant of Formula (I) and the colorant of Formula (II) has an excellent balance of properties of good light resistance, good gas (ozone) resistance, and good moisture resistance in particular in comparison with previous magenta ink compositions, and in accordance with the ink set and ink cartridge of the present invention using the aforementioned ink composition and the recording method and recorded matter utilizing the same, can provide printed matter with excellent moisture resistance that retains a sharp image for a long period of time. In addition, the ink composition of the present invention has little clogging, a sufficient color density can be guaranteed thereby, and it has excellent storage stability as an ink.

Furthermore, by adding the betaine surfactant represented by Formula (V) thereto and a defoaming agent if needed, moisture resistance can be increased without loss of ejection reliability (bubble properties), fastness of the colorant on the recorded matter is markedly increased, and recorded matter with even more excellent durability can be obtained thereby.

DESCRIPTION OF EXEMPLARY EMBODIMENTS

The ink composition of the present invention contains at least one type of compound represented by Formula (I) and at least one type of compound represented by Formula (II) as colorants and as needed, humectant, surfactant, penetration enhancer, viscosity modifier, pH regulator and other additives in an aqueous medium comprising water or water and an organic solvent. By using the compound represented by Formula (I) and the compound represented by Formula (II) in combination, an ink composition with excellent light resistance, gas resistance, moisture resistance, and an excellent balance of properties can be provided.

An ink composition with even more enhanced properties such as fastness of the colorant on the recorded matter, moisture resistance, light resistance, gas resistance and the like can be obtained as a preferred embodiment of the ink composition of the present invention by adding as additives thereto the aforementioned betaine surfactant represented by Formulas (V) to (VII), defoaming agent, aromatic compound having a carboxyl group, urea derivative, nonionic surfactant and penetration enhancer either alone or in a combination of two or more thereof.

Either one type alone or a mixture of a plurality of types of the compound represented by Formula (I) (magenta dye) that is used in the present invention may be used.

In Formula (I): A represents the residue of the five member heterocyclic diazo moiety A—NH$_2$; B$^1$ and B$^2$ represent —CR$^1$═ and —CR$^2$═, or one represents a nitrogen atom, and the other represents —CR$^1$═ or —CR$^2$═; R$^5$ and R$^6$ each independently represents a hydrogen atom, aliphatic group, aromatic group, heterocyclic group, acyl group, alkoxy carbonyl group, aryloxy carbonyl group, carbamoyl group, alkyl sulfonyl group, aryl sulfonyl group, or sulfamoyl group, each group therein being optionally substituted; G, R$^1$ and R$^2$ each independently represents a hydrogen atom, halogen atom, aliphatic group, aromatic group, heterocyclic group, cyano group, carboxyl group, carbamoyl group, alkoxycarbonyl group, aryloxy carbonyl group, acyl group, hydroxyl group, alkoxy group, aryloxy group, silyloxy group, acyloxy group, carbamoyloxy group, heterooxy group, alkoxycarbonyloxy group, aryloxycarbonyloxy group, amino group substituted with an alkyl group or aryl group or heterocyclic group, acylamino group, ureide group, sulfamoylamino group, alkoxycarbonylamino group, aryloxycarbonylamino group, alkyl and aryl sulphonylamino group, aryloxycarbonylamino group, nitro group, alkyl and aryl thio group, alkyl and aryl sulfonyl group, alkyl and aryl sulfinyl group, sulfamoyl group, sulfo group, or heterothio group, each group therein being optionally substituted; and R$^1$ and R$^5$, or R$^5$ and R$^6$ may optionally bond together to form a 5 or 6 member ring.

Among compounds represented by Formula (I), the compound represented by Formula (III) is preferred. In Formula (III): R$_1$ to R$_5$ represent a hydrogen atom, alkyl group, or a sulfo group or salt thereof; and independently R$_1$ and R$_5$ may be optionally substituted provided both are alkyl groups and the total number of carbon atoms constituting those alkyl groups is 3 or more. In addition, when R$_1$ to R$_5$ includes a sulfo group, it takes the form of —SO$_3$M; an alkali metal is preferred as M; and Li and Na or more preferred.

Among the compounds represented by Formula (III), the compound represented by Formula (IV) below is particularly preferred because it has excellent light resistance and gas resistance, and as described below, provides increased moisture resistance with respect to the betaine surfactant.

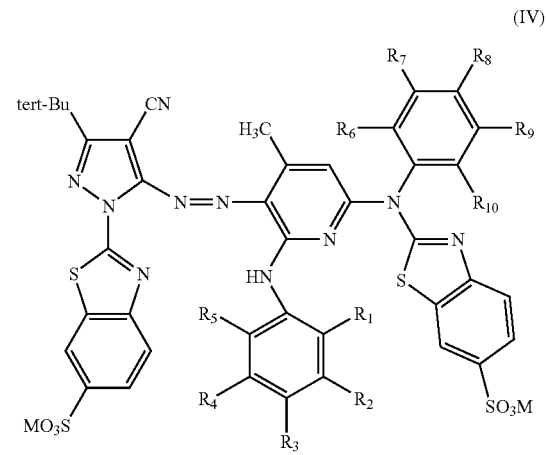

(IV)

(wherein $R_1$ to $R_{10}$ represent a hydrogen atom, alkyl group, or a sulfo group or salt thereof; independently ($R_1$ and $R_5$) and ($R_6$ and $R_{10}$) may be optionally substituted provided both are alkyl groups and the total number of carbon atoms constituting those alkyl groups is 3 or more; and M represents a hydrogen atom or alkaline metal atom).

In the ink composition of the present invention, the compound represented by Formula (II) (magenta dye) is used in combination with the compound represented by Formula (I) as a colorant.

In General Formula (II): M represents a hydrogen atom, ammonium group forming salt, or alkali metal atom; X represents a diaminoalkylene group; and n represents either 1 or 2.

The addition of the compound represented by General Formula (II) is particularly effective in improving moisture resistance. Either one type alone or a mixture of a plurality of types of the compound represented by General Formula (II) may be used. Among compounds represented by General Formula (II), compounds having a structure wherein n is 2 have good moisture resistance and are especially preferred.

Other magenta dyes can be used in the magenta ink composition of the present invention to adjust the color tone and the like provided they are used in a range such that other properties starting with light resistance are not diminished to any great extent.

Magenta dyes other than the compounds represented by Formula (I) and Formula (II) that can be listed as examples include: C.I. Direct Red 2, 4, 9, 23, 26, 31, 39, 62, 63, 72, 75, 76, 79, 80, 81, 83, 84, 89, 92, 95, 111, 173, 184, 207, 211, 212, 214, 218, 221, 223, 224, 225, 226, 227, 232, 233, 240, 241, 242, 243, and 247; C.I. Direct Violet 7, 9, 47, 48, 51, 66, 90, 93, 94, 95, 98, 100, and 101; C.I. Acid Red 35, 42, 52, 57, 62, 80, 82, 111, 114, 118, 119, 127, 128, 131, 143, 151, 154, 158, 249, 254, 257, 261, 263, 266, 289, 299, 301, 305, 336, 337, 361, 396, and 397; C.I. Acid Violet 5, 34, 43, 47, 48, 90, 103, and 126; C.I. Reactive Red 3, 13, 17, 19, 21, 22, 23, 24, 29, 35, 37, 40, 41, 43, 45, 49, and 55; C.I. Reactive Violet 1, 3, 4, 5, 6, 7, 8, 9, 16, 17, 22, 23, 24, 26, 27, 33, and 34; C.I. Basic Red 12, 13, 14, 15, 18, 22, 23, 24, 25, 27, 29, 35, 36, 38, 39, 45, and 46; C.I. Basic Violet 1, 2, 3, 7, 10, 15, 16, 20, 21, 25, 27, 28, 35, 37, 39, 40, and 48; and the like.

In the ink composition of the present invention the content of the compound represented by Formula (I) is preferably 0.2 to 2.5 wt %, and more preferably 0.3 to 2.0 wt % in total with respect to the total weight of the ink composition. By making the content at least 0.2 wt % it is possible to increase light resistance and gas resistance, and by making the content no more than 2.5 wt %, it is possible to prevent a decrease in moisture resistance.

Moreover, the content of the compound represented by Formula (II) is preferably 0.4 to 7.0 wt %, and more preferably 0.6 to 6 wt % in total with respect to the total weight of the ink composition. By making the content at least 0.4 wt % it is possible to increase moisture resistance, and by making the content no more than 7.0 wt %, it is possible to prevent a loss of light resistance.

In the ink composition of the present invention the content ratio of the compound represented by Formula (I) and the compound represented by Formula (II) preferably lies within the range of 2:1 to 1:8, and more preferably within the range of 1:1 to 1:6 by weight. By including both compounds in such proportions, it is possible to satisfy light resistance, gas resistance, and moisture resistance requirements at a high level.

The total of dye solids in the ink composition of the present invention is preferably lies within the range of 0.6 to 8.0 wt % with respect to the total weight of the ink composition. By making the total at least 0.6 wt % it is possible to obtain the required color (maximum concentration), and by making the total no more than 8.0 wt % it is possible to prevent clogging when using the ink set, etc.

Adding the betaine surfactant represented by Formula (V) to the ink composition of the present invention comprising the compound represented by Formula (I) and the compound represented by Formula (II) has the effect not only of remarkably increasing fastness of the colorant to the recording medium and increasing moisture resistance, but also of improving light resistance and gas resistance to the extent that a recorded product able to retain a stable image for a long period of time can be obtained thereby.

In Formula (V): R represents a hydrogen atom, alkyl group, aryl group, or heterocyclic group; L represents a linking group with a valence of 2 or more; M represents a hydrogen atom, alkali metal atom, ammonium group, protonated organic amine or nitrogen-containing heterocyclic group, or a quaternary ammonium ion group, and if serving as a counter ion of an ammonium ion comprising atom N in Formula (V), it represents a group that does not serve as the cation thereof; q represents an integer of 1 or more, and r represents an integer of 1 or more but no greater than 4; p represents an integer of 0 or more but no greater than 4, and p+r is either 3 or 4; if p+r is 4, N is a nitrogen atom constituting a quaternary amine; and when p is 2 or more, R may be either the same or different; when q is 2 or more, COOM may be either the same or different; and when r is 2 or more, L-(COOM)$_q$ may be the same or different.

Among the betaine surfactants represented by Formula (V), the betaine surfactant represented by Formula (VI) is preferred from the aspect of increased fastness of the ink composition to the recording medium. In Formula (VI): $R_1$ to $R_3$ each represents an alkyl group of 1 to 20 carbons; and X represents a linking group with a valence of 2. The betaine surfactant represented by Formula (VII) is especially preferred because of its great effectiveness in increasing the fastness of the ink composition to the recording medium. Either one type alone or a mixture of a plurality of types of the betaine surfactant represented by Formula (V) can be used.

The effect of adding the betaine surfactant represented by Formula (V) is mainly to suppress the decrease in moisture resistance originating in the compound represented by Formula (I), and it also increases the fastness of the colorant to the recording medium. The content ratio of the compound represented by Formula (I) to the betaine surfactant represented by Formula (V) preferably lies in the range of 1:3 to 3:1 by weight, and more preferably within the range of 1:2 to 2:1. Setting the content ratio of the compound represented by Formula (I) to betaine surfactant within this range enables an outstanding improvement in fastness of the colorant to the recording medium obtained thereby.

As noted above, the betaine surfactant represented by Formula (V) has the effect of improving the properties of the ink composition, and the effect of increasing fastness is particularly great, but the foamability thereof is high, and depending on the amount added and the combination with other additives, the foamability of the ink composition can become too high, the burden on the ink system can become too great, and system configuration can become too expensive.

Therefore, if a betaine surfactant with the above structure is added to the ink composition of the present invention, the addition of the specified defoaming agent is preferred.

As a defoaming agent to be used in combination with the above betaine surfactant in the ink composition of the present invention, an aliphatic diol of 4 to 6 carbons with a hydroxyl number of 1 to 2, or a diacetylene tetraol compound is preferred.

Examples of an aliphatic compound of 4 to 6 carbons with a hydroxyl number of 1 to 2 include 1,4-butanediol, 1,5-pentanediol, 1,2-hexanediol, and 1,6-hexanediol, etc., and among these 1,2-hexanediol is preferred. An example of a diacetylene tetraol compound is Surfynol MD-20 manufactured by Air Products and Chemicals, Inc., which can be obtained commercially.

If the amount of the defoaming agent contained therein is too small, the defoaming effect on the ink composition will be insufficient, and if too large, print quality and storage stability will be lost. Therefore, in the present invention the amount of defoaming agent contained in the ink composition preferably lies within the range of 0.05 to 10.0 wt %, and more preferably within the range of 0.1 to 5.0 wt %.

By making the content ratio of the defoaming agent to the betaine surfactant represented by Formula (V) within the range of 1:10 to 4:1 by weight, overall a well-balanced ink composition having excellent foaming suppression and defoaming effectiveness, as well as excellent print stability can be obtained.

In the present invention at least one type selected from a group consisting of an aromatic compound or a salt thereof having a carboxyl group can be used to increase moisture resistance and fastness of the colorant to the recording medium. Any aromatic compound or salt thereof having at least 1 carboxyl group in its molecular structure can be used, but preferably the compound will have 1 carboxyl group, and more preferably it will have a naphthalene scaffold. In addition a compound or salt thereof having a naphthalene scaffold with a carboxyl group at position 2 is more preferable, and even more preferable is the alkali metal salt of a compound having a naphthalene scaffold and a carboxyl group at position 2. Among the alkali metal salts of a compound having a naphthalene scaffold and a carboxyl group at position 2, the lithium salts are preferred from the standpoint of resistance to clogging.

Examples of an aromatic compound or salt thereof having a carboxyl group specifically include 2-hydroxy-1-naphthoic acid, 1-hydroxy-2-naphthoic acid, 1-naphthoic acid, 2-naphthoic acid, 3-hydroxy-2-naphthoic acid, 6-hydroxy-2-naphthoic acid, 3-methoxy-2-naphthoic acid, 6-methoxy-2-napthanoic acid, 6-ethocy-2-naphthoic acid, 6-propoxy-2-naphthanic acid, 4-hydroxybenzoic acid, 2,6-naphthylene dicarboxylic acid, etc., and salts thereof (especially lithium salts).

The salt of the aromatic compound having a carboxyl group can be added in the salt form and included in the ink as is, or both the aromatic compound having a carboxyl group and a base can be added separately and included in the ink.

The content of at least one type selected from a group consisting of an aromatic compound or a salt thereof having a carboxyl group is determined based on the type of aromatic compound and/or salt thereof having a carboxyl group, type of colorant, type of solvent component, and other additives, etc., but preferably the amount thereof lies within the range of 0.1 to 10 wt %, and more preferably 0.5 to 5 wt % with respect to the total weight of the ink composition.

The content ratio of the compound represented by Formula (I) to at least one type selected from a group consisting of an aromatic compound or a salt thereof having a carboxyl group preferably lies within the range of 5:1 to 1:3 and more preferably within the range of 3:1 to 1:2 by weight. By making the content ratio higher than 5:1 sufficient improvement in moisture resistance can be obtained and by making the content ratio lower than 1:3 anti-clogging properties (clogging reliability) and the like can be easily guaranteed.

The light resistance of the ink composition of the present invention can be increased by adding a urea derivative thereto.

Examples of a urea derivative used in the present invention include urea, allylurea, dimethylolurea, malonylurea, carbamylurea, n-butylurea, dibutylurea, N,N-dimethylurea, 1,3-dimethylurea, N-methylurea, hydroxyurea, ethylurea, methylurea, creatinine, 2-imidazolidinone, benzylurea, (R)-(+)-1-phenylethyl urea, phenylurea, 3-hydroxyphenylurea, 1-phenyl semicarbazide, 4-phenyl semicarbazide, N-benzoylurea, and N,N'—O-phenylurea; one type alone or two or more types in combination can be used in the present invention.

The content of urea derivative preferably lies within the range of 0.5 to 20 wt %, more preferably within the range of 1 to 16 wt %, and even more preferably within the range of 2 to 12 wt % with respect to the total weight of the ink composition. By making the content at least 0.5 wt % the effect of increasing light resistance by adding the urea derivative becomes clear, and by making the content no more than 20 wt % reliability of clogging properties and the like can be maintained.

The content ratio of the compounds represented by Formula (I) and Formula (II) in the ink composition to the urea derivative preferably lies within the range of 5:1 to 1:10, more preferably within the range of 4:1 to 1:8, and even more preferably within the range of 3:1 to 1:5. By making the proportions of both lie within this range increased light resistance and guarantee of other properties from the standpoint of reliability can be established at a high level.

To stably dissolve the colorant and betaine surfactant, aromatic compound having a carboxyl group, urea derivative and the like, the preferred pH (at 20° C.) of the ink composition is at least 8.0. In consideration of the material resistance properties of each part that comes in contact with the ink composition, the preferred pH of the ink composition is no greater than 10.5. To achieve both of these goals even better, adjusting the pH of the ink composition to within the range of 8.5 to 10.0 is preferred.

In the magenta ink composition of the present invention the use of water or a liquid mixture of water and a water-miscible organic solvent as the main solvent is preferred.

Ion exchange water, ultrafiltration water, reverse osmosis water, distilled water and the like can be used for the water. The use of water wherein a sterilization treatment has been performed by UV light exposure or the addition of hydrogen peroxide and the like is preferred from the aspect of long term storage.

In the magenta ink composition of the present invention the amount of water contained therein when used as the main solvent is preferably 40 to 90 wt %, and more preferably 50 to 80 wt % with respect to the total weight of the ink composition.

The magenta ink composition of the present invention can contain at least one type of humectant selected from a group consisting of water-miscible organic solvents with a vapor pressure less than that of pure water and sugars.

By containing a humectant therein, it is possible to suppress evaporation of the water component and keep the ink in the inkjet recording system moist. Moreover, if a water-miscible organic solvent is used, it is possible to increase ejection stability and easily alter the viscosity without causing a change in the ink properties.

The term water-miscible organic solvent refers to a solvent capable of dissolving a solute, and is selected from water-miscible solvents that are organic and have a vapor pressure lower than that of water. More specifically, polyhydric alcohols such as ethylene glycol, propylene glycol, glycerin, 1,2,6-hexanetriol, diethylene glycol, triethylene glycol, dipropylene glycol; ketones such as acetonyl acetone, etc.; esters such as γ-butyrolactone, triethyl phosphate, etc.; furfuryl alcohol, tetrahydrofurfuryl alcohol, thiodiglycol, etc., are preferred.

In addition, preferred sugars include maltitol, sorbitol, gluconolactone, maltose, etc.

The humectant is added preferably within a range of 5 to 50 wt %, more preferably 5 to 30 wt %, and even more preferably 5 to 20 wt % with respect to the total weight of the ink composition. If the content is at least 5 wt %, moisture retention can be obtained, and if the content is no more than 50 wt %, it is easy to adjust the viscosity used in inkjet recording.

It is preferable to include a nitrogen-containing organic solvent as a solvent in the magenta ink composition of the present invention. Nitrogen-containing organic solvents include 1,3-dimethyl-2-imidazolidinone, 2-pyrrolidone, N-methyl-2-pyrrolidone, ε-caprolactam, etc., and among these 2-pyrrolidone can be used quite suitably. These nitrogen-containing organic solvents can be used alone or in a combination of two or more types thereof.

The content thereof is preferably 0.5 to 10 wt %, and more preferably 1 to 5 wt % with respect to the total weight of the ink composition. By making the content at least 0.5 wt % it is possible to expect increased solubility of various ingredients through the addition thereof, and by making the content no more than 10 wt % the material resistance properties of the various parts that come in contact with the ink composition will not be adversely affected.

It is also preferable to include a nonionic surfactant in the magenta ink composition of the present invention as an additive that is effective in obtaining rapid fixing (penetration) of the ink and at the same time effective in preserving the roundness of a single dot.

An acetylene glycol surfactant can be listed as an example of the nonionic surfactant used in the present invention. More specifically, Surfynol 465, Surfynol 104 (brand names manufactured by Air Products and Chemicals, Inc.), Olfine STG, Olfine E1010 (brand name manufactured by Nissin Chemical Industry Co., Ltd.), etc., can be listed as acetylene glycol surfactants. The added amount thereof is preferably 0.1 to 5 wt %, and more preferably 0.5 to 2 wt % with respect to the total weight of the ink composition. By making the added amount at least 0.1 wt % it is possible to obtain sufficient penetration, and by making the added amount no more than 5 wt % it is easy to prevent bleeding of the image.

By adding a diglycol ether as a penetration enhancer in addition to the nonionic surfactant it is possible to increase penetration even more, reduce bleeding of adjacent color inks when performing color printing, and obtain an extremely sharp image.

Examples of diglycol ethers that can be used in the present invention include ethylene glycol monobutyl ether, diethylene glycol monobutyl ether, triethylene glycol monoethyl ether, propylene glycol monomethyl ether, dipropylene glycol monoethyl ether, propylene glycol monobutyl ether, dipropylene glycol monobutyl ether, triethylene glycol monobutyl ether, etc. The added amount is preferably 3 to 30 wt %, and more preferably 5 to 15 wt % with respect to the total weight of the ink composition. By making the added amount at least 3 wt % a sufficient anti-bleeding effect can be obtained, and by making the added amount not more than 30 wt % it is easy to prevent bleeding of the image and storage stability of the ink is easy to guarantee.

The following may be added to the ink composition of the present invention as needed: a pH regulator such as triethanolamine, an alkali metal hydroxide, etc.; a hydrotropy agent; a water-soluble polymer such as sodium alginate, etc.; water-soluble resin; fluorinated surfactant; preservative; antifungal agent; rust inhibitor; etc.

Examples of a preservative or antifungal agent include sodium benzoate, sodium pentachlorophenol, sodium 2-pyridinethiol-1-oxide, sodium sorbate, sodium dehydroacetate, 1,2-dibenzisothiazolin-3-one (Proxel CRL, Proxel BDN, Proxel GXL, Proxel XL-2, Proxel TN manufactured by Avecia Ltd.) and the like.

Examples of the pH regulator, solubilizing agent, or antioxidant include amines such as diethanolamine, triethanolamine, propanolamine, morpholine and modified products thereof; metal hydroxides such as potassium hydroxide, sodium hydroxide, lithium hydroxide; ammonium salts such as ammonium hydroxide, quaternary ammonium hydroxides (tetramethylammonium, etc.); carbonates such as potassium carbonate, sodium carbonate, lithium carbonate and the like; and phosphates; pyrrolidones such as N-methyl-2-pyrrolidone; 2-pyrrolidone, etc.; allophanates such as allophanate, methyl allophanate, etc.; biurets such as biuret, dimethyl biuret, tetramethyl biuret, etc.; and L-ascorbic acid and salts thereof.

The above arbitrary ingredients can be used in the ink composition of the present invention either alone or as a mixture of a plurality thereof selected either from within a group or from among different groups.

The amounts of all ingredients in the magenta ink composition of the present invention are preferably selected such that the viscosity of the ink composition at 20° C. lies within the range of 2 to 10 mPa·s.

In addition, the surface tension of the magenta ink composition of the present invention at 20° C. will preferably be no more than 45 mN/m, and more preferably lie within the range of 25 to 45 mN/m.

Methods for preparing the magenta ink composition of the present invention include, for example, one wherein the ingredients are thoroughly mixed and dissolved, the mixture is pressure filtered through a membrane filter with a pore size of about 0.8 μm, and then subjected to a degassing treatment using a vacuum pump.

Next, the recording method of the present invention that uses the ink composition described above will be explained. The inkjet recording method wherein an ink composition is ejected as droplets from fine holes and recording is performed by depositing those droplets on a recording medium is particularly suitable as the recording method of the present invention, but of course the ink composition of the present invention can be used in general writing instruments, recorders, pen plotters, and the like.

Any existing, publicly known method can be used as the inkjet recording method, and in particular excellent image recording can be performed with the method wherein a droplet is ejected using the vibration of a piezoelectric element (recording method using an inkjet head that forms ink droplets by mechanical deformation of an electrostriction element) and a method using thermal energy.

EXAMPLES

The present invention is described in detail below using Examples and Comparative Examples. However, the present invention is by no means limited to the materials, compositions, and manufacturing methods described in the Examples.

Examples 1 to 32 and Comparative Examples 1 to 12

At least Compound A represented by Formula (VIII) below, which is one compound represented by Formula (I), Compound B represented by Formula (IX) below, which is one compound represented by formula (IV), and Compound C represented by Formula (X), which is one compound represented by Formula (II) were used as colorants and, including the ink compositions wherein the compound represented by Formula (VII) (betaine surfactant) was added, the various ingredients were mixed and dissolved in the formulation ratios shown in Tables 1 and 2 (Examples) and Table 3 (Comparative Examples), and the mixtures were pressure filtered using a membrane filter with a pore size of 1 μm to prepare the various ink compositions. Examples 8, 12, 24, and 28 are shown as examples containing an aromatic compound having a carboxyl group in the ink composition.

The total colorant solids in the Examples and Comparative Examples are the same as the totals of the ratios of colorant ingredients listed in Tables 1 to 3.

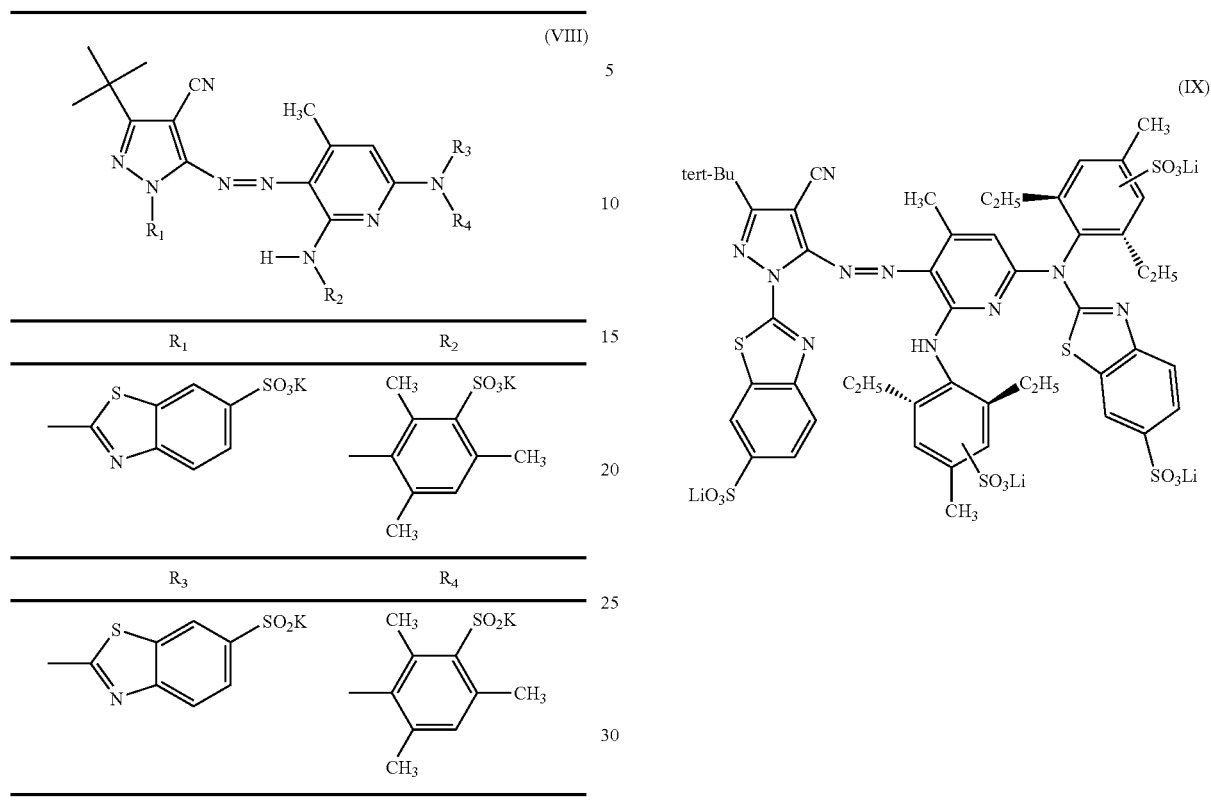
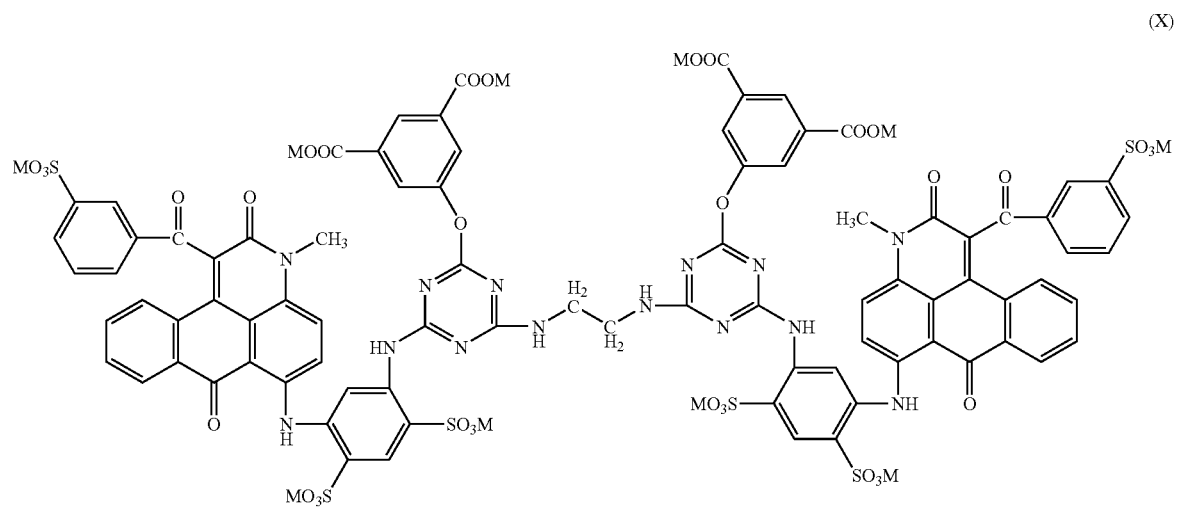
| | | EXAMPLE NO. (UNITS: wt %) | | | | | | | |
|---|---|---|---|---|---|---|---|---|---|
| | | 1 | 2 | 3 | 4 | 5 | 6 | 7 | 8 |
| COLORANT | COMPOUND A (SUBSTANCE OF FORMULA (VIII)) | 0.3 | 0 | 0 | 0 | 0 | 0 | 0 | 0 |
| | COMPOUND B (SUBSTANCE | 0 | 0.3 | 1 | 1.5 | 2 | 1 | 1 | 1 |
TABLE 1

TABLE 1-continued

|  |  |  |  |  |  |  |  |  |  |
|---|---|---|---|---|---|---|---|---|---|
|  | OF FORMULA (IX)) |  |  |  |  |  |  |  |  |
|  | COMPOUND C (SUBSTANCE OF FORMULA (X)) | 6.8 | 6.8 | 5 | 4 | 2.8 | 5 | 5 | 5 |
|  | C.I. ACID RED 52 | 0 | 0 | 0 | 0 | 0 | 0 | 0 | 0 |
| ORGANIC SOLVENT | TRIETHYLENE GLYCOL MONOBUTYL ETHER | 10 | 10 | 10 | 10 | 10 | 10 | 10 | 10 |
|  | GLYCERIN | 10 | 10 | 10 | 10 | 10 | 10 | 10 | 10 |
|  | TRIETHYLENE GLYCOL | 3 | 3 | 3 | 3 | 3 | 3 | 3 | 3 |
|  | 2-PYRROLIDONE | 2 | 2 | 2 | 2 | 2 | 2 | 2 | 2 |
| ALKALI | TRIETHANOLAMINE | 0.4 | 0.4 | 0.4 | 0.4 | 0.4 | 0.4 | 0.4 | 0.4 |
| SURFACTANT | OLFINE E1010 (*1) | 0.8 | 0.8 | 0.8 | 0.8 | 0.8 | 0.8 | 0.8 | 0.8 |
|  | UREA | 0 | 0 | 0 | 0 | 0 | 5 | 0 | 0 |
|  | COMPOUND D (SUBSTANCE OF FORMULA (VII)) | 0 | 0 | 0 | 0 | 0 | 0 | 1 | 0 |
|  | 2-NAPHTHOIC ACID | 0 | 0 | 0 | 0 | 0 | 0 | 0 | 3 |
|  | LITHIUM HYDROXIDE MONOHYDRATE | 0 | 0 | 0 | 0 | 0 | 0 | 0 | 0.75 |
|  | 1,2-HEXANEDIOL | 0 | 0 | 0 | 0 | 0 | 0 | 0 | 0 |
|  | SURFYNOL MD-20 (*2) | 0 | 0 | 0 | 0 | 0 | 0 | 0 | 0 |
| RUST INHIBITOR | BENZOTRIAZOLE | 0.01 | 0.01 | 0.01 | 0.01 | 0.01 | 0.01 | 0.01 | 0.01 |
| PRESERVATIVE | PROXEL XL-2 (*3) | 0.3 | 0.3 | 0.3 | 0.3 | 0.3 | 0.3 | 0.3 | 0.3 |
| CHELATING AGENT | DISODIUM EDTA | 0.02 | 0.02 | 0.02 | 0.02 | 0.02 | 0.02 | 0.02 | 0.02 |
| OTHER | ULTRAPURE WATER | 66.37 | 66.37 | 67.47 | 67.97 | 68.57 | 62.47 | 66.47 | 63.72 |
|  | TOTAL | 100 | 100 | 100 | 100 | 100 | 100 | 100 | 100 |

|  |  | EXAMPLE NO. |  |  |  |  |  |  |  |
|---|---|---|---|---|---|---|---|---|---|
|  |  | 9 | 10 | 11 | 12 | 13 | 14 | 15 | 16 |
| COLORANT | COMPOUND A (SUBSTANCE OF FORMULA (VIII)) | 0 | 0 | 0 | 0 | 0 | 0 | 0 | 0 |
|  | COMPOUND B (SUBSTANCE OF FORMULA (IX)) | 1 | 1 | 1 | 1 | 1 | 1 | 2 | 2 |
|  | COMPOUND C (SUBSTANCE OF FORMULA (X)) | 5 | 5 | 5 | 6 | 5 | 5 | 2.8 | 2.8 |
|  | C.I. ACID RED 52 | 0 | 0 | 0 | 0 | 0 | 0 | 0 | 0 |
| ORGANIC SOLVENT | TRIETHYLENE GLYCOL MONOBUTYL ETHER | 10 | 10 | 10 | 10 | 10 | 10 | 10 | 10 |
|  | GLYCERIN | 10 | 10 | 10 | 10 | 10 | 10 | 10 | 10 |
|  | TRIETHYLENE GLYCOL | 3 | 3 | 3 | 3 | 3 | 3 | 3 | 3 |
|  | 2-PYRROLIDONE | 2 | 2 | 2 | 2 | 2 | 2 | 2 | 2 |
| ALKALI | TRIETHANOLAMINE | 0.4 | 0.4 | 0.4 | 0.4 | 0.4 | 0.4 | 0.4 | 0.4 |
| SURFACTANT | OLFINE E1010 (*1) | 0.8 | 0.8 | 0.8 | 0.8 | 0.8 | 0.8 | 0.8 | 0.8 |
|  | UREA | 0 | 0 | 0 | 0 | 5 | 5 | 0 | 0 |
|  | COMPOUND D (SUBSTANCE OF FORMULA (VII)) | 1 | 1 | 1 | 1 | 1 | 1 | 2 | 2 |
|  | 2-NAPHTHOIC ACID | 0 | 0 | 0 | 3 | 0 | 0 | 0 | 0 |
|  | LITHIUM HYDROXIDE MONOHYDRATE | 0 | 0 | 0 | 0.75 | 0 | 0 | 0 | 0 |
|  | 1,2-HEXANEDIOL | 3 | 0 | 3 | 0 | 1 | 0 | 0 | 4 |
|  | SURFYNOL MD-20 (*2) | 0 | 0.1 | 0.1 | 0 | 0 | 0.1 | 0 | 0.2 |
| RUST INHIBITOR | BENZOTRIAZOLE | 0.01 | 0.01 | 0.01 | 0.01 | 0.01 | 0.01 | 0.01 | 0.01 |
| PRESERVATIVE | PROXEL XL-2 (*3) | 0.3 | 0.3 | 0.3 | 0.3 | 0.3 | 0.3 | 0.3 | 0.3 |
| CHELATING AGENT | DISODIUM EDTA | 0.02 | 0.02 | 0.02 | 0.02 | 0.02 | 0.02 | 0.02 | 0.02 |
| OTHER | ULTRAPURE WATER | 63.47 | 66.37 | 63.37 | 62.72 | 60.47 | 61.37 | 66.67 | 62.47 |
|  | TOTAL | 100 | 100 | 100 | 100 | 100 | 100 | 100 | 100 |

(*1) NISSIN CHEMICAL INDUSTRY CO., LTD.
(*2) AIR PRODUCTS AND CHEMICALS, INC.
(*3) FUJIFILM IMAGING COLORANTS, LTD.

TABLE 2

|  |  |  |  |  |  |  |  | (UNITS: wt %) |  |
|---|---|---|---|---|---|---|---|---|---|
|  |  | EXAMPLE NO. |  |  |  |  |  |  |  |
|  |  | 17 | 18 | 19 | 20 | 21 | 22 | 23 | 24 |
| COLORANT | COMPOUND A (SUBSTANCE OF FORMULA (VIII)) | 0.2 | 0 | 0 | 0 | 0 | 0 | 0 | 0 |
|  | COMPOUND B (SUBSTANCE OF FORMULA (IX)) | 0 | 0.2 | 0.4 | 0.6 | 0.8 | 0.6 | 0.6 | 0.6 |
|  | COMPOUND C (SUBSTANCE OF FORMULA (X)) | 1.7 | 1.7 | 1.3 | 0.9 | 0.5 | 0.9 | 0.9 | 0.9 |
|  | C.I. ACID RED 52 | 0 | 0 | 0 | 0 | 0 | 0 | 0 | 0 |

TABLE 2-continued

| ORGANIC SOLVENT | TRIETHYLENE GLYCOL MONOBUTYL ETHER | 10 | 10 | 10 | 10 | 10 | 10 | 10 | 10 |
|---|---|---|---|---|---|---|---|---|---|
| | GLYCERIN | 10 | 10 | 10 | 10 | 10 | 10 | 10 | 10 |
| | TRIETHYLENE GLYCOL | 5 | 5 | 5 | 5 | 5 | 5 | 5 | 5 |
| | 2-PYRROLIDONE | 2 | 2 | 2 | 2 | 2 | 2 | 2 | 2 |
| ALKALI | TRIETHANOLAMINE | 0.4 | 0.4 | 0.4 | 0.4 | 0.4 | 0.4 | 0.4 | 0.4 |
| SURFACTANT | OLFINE E1010 (*1) | 0.8 | 0.8 | 0.8 | 0.8 | 0.8 | 0.8 | 0.8 | 0.8 |
| | UREA | 0 | 0 | 0 | 0 | 0 | 5 | 0 | 0 |
| | COMPOUND D (SUBSTANCE OF FORMULA (VII)) | 0 | 0 | 0 | 0 | 0 | 0 | 1 | 0 |
| | 2-NAPHTHOIC ACID | 0 | 0 | 0 | 0 | 0 | 0 | 0 | 3 |
| | LITHIUM HYDROXIDE MONOHYDRATE | 0 | 0 | 0 | 0 | 0 | 0 | 0 | 0.75 |
| | 1,2-HEXANEDIOL | 0 | 0 | 0 | 0 | 0 | 0 | 0 | 0 |
| | SURFYNOL MD-20 (*2) | 0 | 0 | 0 | 0 | 0 | 0 | 0 | 0 |
| RUST INHIBITOR | BENZOTRIAZOLE | 0.01 | 0.01 | 0.01 | 0.01 | 0.01 | 0.01 | 0.01 | 0.01 |
| PRESERVATIVE | PROXEL XL-2 (*3) | 0.3 | 0.3 | 0.3 | 0.3 | 0.3 | 0.3 | 0.3 | 0.3 |
| CHELATING AGENT | DISODIUM EDTA | 0.02 | 0.02 | 0.02 | 0.02 | 0.02 | 0.02 | 0.02 | 0.02 |
| OTHER | ULTRAPURE WATER | 69.57 | 69.57 | 69.77 | 69.97 | 70.17 | 64.97 | 68.97 | 66.22 |
| | TOTAL | 100 | 100 | 100 | 100 | 100 | 100 | 100 | 100 |

| | | EXAMPLE NO. | | | | | | | |
|---|---|---|---|---|---|---|---|---|---|
| | | 25 | 26 | 27 | 28 | 29 | 30 | 31 | 32 |
| COLORANT | COMPOUND A (SUBSTANCE OF FORMULA (VIII)) | 0 | 0 | 0 | 0 | 0 | 0 | 0 | 0 |
| | COMPOUND B (SUBSTANCE OF FORMULA (IX)) | 0.6 | 0.6 | 0.6 | 0.6 | 0.6 | 0.6 | 0.8 | 0.8 |
| | COMPOUND C (SUBSTANCE OF FORMULA (X)) | 0.9 | 0.9 | 0.9 | 0.9 | 0.9 | 0.9 | 0.5 | 0.5 |
| | C.I. ACID RED 52 | 0 | 0 | 0 | 0 | 0 | 0 | 0 | 0 |
| ORGANIC SOLVENT | TRIETHYLENE GLYCOL MONOBUTYL ETHER | 10 | 10 | 10 | 10 | 10 | 10 | 10 | 10 |
| | GLYCERIN | 10 | 10 | 10 | 10 | 10 | 10 | 10 | 10 |
| | TRIETHYLENE GLYCOL | 5 | 5 | 5 | 5 | 5 | 5 | 5 | 5 |
| | 2-PYRROLIDONE | 2 | 2 | 2 | 2 | 2 | 2 | 2 | 2 |
| ALKALI | TRIETHANOLAMINE | 0.4 | 0.4 | 0.4 | 0.4 | 0.4 | 0.4 | 0.4 | 0.4 |
| SURFACTANT | OLFINE E1010 (*1) | 0.8 | 0.8 | 0.8 | 0.8 | 0.8 | 0.8 | 0.8 | 0.8 |
| | UREA | 0 | 0 | 0 | 0 | 5 | 5 | 0 | 0 |
| | COMPOUND D (SUBSTANCE OF FORMULA (VII)) | 1 | 1 | 1 | 1 | 1 | 1 | 1.5 | 1.5 |
| | 2-NAPHTHOIC ACID | 0 | 0 | 0 | 3 | 0 | 0 | 0 | 0 |
| | LITHIUM HYDROXIDE MONOHYDRATE | 0 | 0 | 0 | 0.75 | 0 | 0 | 0 | 0 |
| | 1,2-HEXANEDIOL | 3 | 0 | 3 | 0 | 1 | 0 | 0 | 4 |
| | SURFYNOL MD-20 (*2) | 0 | 0.1 | 0.1 | 0 | 0 | 0.1 | 0 | 0.2 |
| RUST INHIBITOR | BENZOTRIAZOLE | 0.01 | 0.01 | 0.01 | 0.01 | 0.01 | 0.01 | 0.01 | 0.01 |
| PRESERVATIVE | PROXEL XL-2 (*3) | 0.3 | 0.3 | 0.3 | 0.3 | 0.3 | 0.3 | 0.3 | 0.3 |
| CHELATING AGENT | DISODIUM EDTA | 0.02 | 0.02 | 0.02 | 0.02 | 0.02 | 0.02 | 0.02 | 0.02 |
| OTHER | ULTRAPURE WATER | 65.97 | 68.87 | 65.87 | 65.22 | 62.97 | 63.87 | 68.87 | 64.47 |
| | TOTAL | 100 | 100 | 100 | 100 | 100 | 100 | 100 | 100 |

(*1) NISSIN CHEMICAL INDUSTRY CO., LTD.
(*2) AIR PRODUCTS AND CHEMICALS, INC.
(*3) FUJIFILM IMAGING COLORANTS, LTD.

TABLE 3

(UNITS: wt %)

| | | COMPARATIVE EXAMPLE NO. | | | | | |
|---|---|---|---|---|---|---|---|
| | | 1 | 2 | 3 | 4 | 5 | 6 |
| COLORANT | COMPOUND A (SUBSTANCE OF FORMULA (VIII)) | 3.6 | 0 | 0 | 0 | 0 | 0 |
| | COMPOUND B (SUBSTANCE OF FORMULA (IX)) | 0 | 3.6 | 0 | 0 | 1.8 | 0 |
| | COMPOUND C (SUBSTANCE OF FORMULA (X)) | 0 | 0 | 7 | 0 | 0 | 3.5 |
| | C.I. ACID RED 52 | 0 | 0 | 0 | 3 | 1.5 | 1.5 |
| ORGANIC SOLVENT | TRIETHYLENE GLYCOL MONOBUTYL ETHER | 10 | 10 | 10 | 10 | 10 | 10 |
| | GLYCERIN | 10 | 10 | 10 | 10 | 10 | 10 |
| | TRIETHYLENE GLYCOL | 3 | 3 | 3 | 3 | 3 | 3 |
| | 2-PYRROLIDONE | 2 | 2 | 2 | 2 | 2 | 2 |
| ALKALI | TRIETHANOLAMINE | 0.4 | 0.4 | 0.4 | 0.4 | 0.4 | 0.4 |
| SURFACTANT | OLFINE E1010 (*1) | 0.8 | 0.8 | 0.8 | 0.8 | 0.8 | 0.8 |
| | UREA | 0 | 0 | 0 | 0 | 0 | 0 |

TABLE 3-continued

|  |  |  |  |  |  |  |  |
|---|---|---|---|---|---|---|---|
|  | COMPOUND D (SUBSTANCE OF FORMULA (VII)) | 0 | 0 | 0 | 0 | 0 | 0 |
|  | 2-NAPHTHOIC ACID | 0 | 0 | 0 | 0 | 0 | 0 |
|  | LITHIUM HYDROXIDE MONOHYDRATE | 0 | 0 | 0 | 0 | 0 | 0 |
|  | 1,2-HEXANEDIOL | 0 | 0 | 0 | 0 | 0 | 0 |
|  | SURFYNOL MD-20 (*2) | 0 | 0 | 0 | 0 | 0 | 0 |
| RUST INHIBITOR | BENZOTRIAZOLE | 0.01 | 0.01 | 0.01 | 0.01 | 0.01 | 0.01 |
| PRESERVATIVE | PROXEL XL-2 (*3) | 0.3 | 0.3 | 0.3 | 0.3 | 0.3 | 0.3 |
| CHELATING AGENT | DISODIUM EDTA | 0.02 | 0.02 | 0.02 | 0.02 | 0.02 | 0.02 |
| OTHER | ULTRAPURE WATER | 69.87 | 69.87 | 66.47 | 70.47 | 70.17 | 68.47 |
|  | TOTAL | 100 | 100 | 100 | 100 | 100 | 100 |

|  |  | COMPARATIVE EXAMPLE NO. | | | | | |
|---|---|---|---|---|---|---|---|
|  |  | 7 | 8 | 9 | 10 | 11 | 12 |
| COLORANT | COMPOUND A (SUBSTANCE OF FORMULA (VIII)) | 1 | 0 | 0 | 0 | 0 | 0 |
|  | COMPOUND B (SUBSTANCE OF FORMULA (IX)) | 0 | 1 | 0 | 0 | 0.5 | 0 |
|  | COMPOUND C (SUBSTANCE OF FORMULA (X)) | 0 | 0 | 2.3 | 0 | 0 | 1 |
|  | C.I. ACID RED 52 | 0 | 0 | 0 | 1.2 | 0.6 | 0.6 |
| ORGANIC | TRIETHYLENE GLYCOL MONOBUTYL ETHER | 10 | 10 | 10 | 10 | 10 | 10 |
| SOLVENT | GLYCERIN | 10 | 10 | 10 | 10 | 10 | 10 |
|  | TRIETHYLENE GLYCOL | 5 | 5 | 5 | 5 | 5 | 5 |
|  | 2-PYRROLIDONE | 2 | 2 | 2 | 2 | 2 | 2 |
| ALKALI | TRIETHANOLAMINE | 0.4 | 0.4 | 0.4 | 0.4 | 0.4 | 0.4 |
| SURFACTANT | OLFINE E1010 (*1) | 0.8 | 0.8 | 0.8 | 0.8 | 0.8 | 0.8 |
|  | UREA | 0 | 0 | 0 | 0 | 0 | 0 |
|  | COMPOUND D (SUBSTANCE OF FORMULA (VII)) | 0 | 0 | 0 | 0 | 0 | 0 |
|  | 2-NAPHTHOIC ACID | 0 | 0 | 0 | 0 | 0 | 0 |
|  | LITHIUM HYDROXIDE MONOHYDRATE | 0 | 0 | 0 | 0 | 0 | 0 |
|  | 1,2-HEXANEDIOL | 0 | 0 | 0 | 0 | 0 | 0 |
|  | SURFYNOL MD-20 (*2) | 0 | 0 | 0 | 0 | 0 | 0 |
| RUST INHIBITOR | BENZOTRIAZOLE | 0.01 | 0.01 | 0.01 | 0.01 | 0.01 | 0.01 |
| PRESERVATIVE | PROXEL XL-2 (*3) | 0.3 | 0.3 | 0.3 | 0.3 | 0.3 | 0.3 |
| CHELATING AGENT | DISODIUM EDTA | 0.02 | 0.02 | 0.02 | 0.02 | 0.02 | 0.02 |
| OTHER | ULTRAPURE WATER | 70.47 | 70.47 | 69.17 | 70.27 | 70.37 | 69.87 |
|  | TOTAL | 100 | 100 | 100 | 100 | 100 | 100 |

(*1) NISSIN CHEMICAL INDUSTRY CO., LTD.
(*2) AIR PRODUCTS AND CHEMICALS, INC.
(*3) FUJIFILM IMAGING COLORANTS, LTD.

Dedicated cartridges (magenta chamber) of an inkjet printer PM-A700 (Seiko Epson Corp.) were filled with the ink compositions of Examples 1 to 16 and Comparative Examples 1 to 6, printing was performed using that printer on an inkjet recording medium (Crispia™ high gloss photographic paper, Product No. KA420SCK (Seiko Epson Corp.)), and various evaluative tests were performed.

Light Resistance Test

Printing was performed using the cartridges filled with the ink compositions, and the print duty was adjusted so the OD (optical density) was within the range of 0.9 to 1.1. After the printed matter was let stand for one day away from direct sunlight in an environment with normal temperature and humidity, resistance to light was evaluated under the following conditions.

Using a Xenon Weather Resistance Apparatus (model XL-75 manufactured by Suga Test Instruments Co., Ltd.), the printed product was exposed to light at 24° C., 60% RH, and 70,000 lux. Five samples of printed product were exposed for 5, 9, 14, 21, and 28 days, respectively.

After exposure, the OD of each printed product was measured using a reflection densitometer (Spectrolino manufactured by Gretag-Macbeth AG), and the relict optical density (ROD) was determined by the following formula.

$$ROD(\%) = (D/D_0) \times 100$$

D: OD after exposure test
$D_0$: OD before exposure test (Measurement conditions: green filter, light source: D50, angular field of view 2°)

By plotting the exposure time (number of days) on the horizontal axis and the measured ROD on the vertical axis, an approximation curve of fading of the printed matter was determined. By the approximation formula obtained thereby, the time until the ROD would fall to 70% was determined, and light resistance was evaluated using the following scoring criteria. The results are shown in Table 2.

Scoring Criteria

A: ROD does not decrease to 70% until 30 days have elapsed.
B: Decrease of ROD to 70% occurs in >25 days but ≦30 days.
C: Decrease of ROD to 70% occurs in >20 days but ≦25 days.
D: Decrease of ROD to 70% occurs in >15 days but ≦20 days.
E: Decrease of ROD to 70% occurs in >10 days but ≦15 days.
F: Decrease of ROD to 70% occurs in ≦10 days.

Gas Resistance (Ozone Resistance) Test

Printing was performed using the cartridges filled with the ink compositions, and the print duty was adjusted so the OD (optical density) was within the range of 0.9 to 1.1. After the printed matter obtained thereby was let stand for one day away from direct sunlight in an environment with normal temperature and humidity, and the ozone resistance was evaluated under the following conditions.

Using an Ozone Weather Meter™ (model OMS-H manufactured by Suga Test Instruments Co., Ltd.) the printed matter was exposed to ozone 24° C., 60% RH, and ozone concentration of 40 ppm. Five samples of printed matter were exposed for 8, 12, 16, 20, and 24 hours, respectively.

The optical density (OD) of the printed matter after exposure to ozone was measured using a reflection densitometer (Spectrolino manufactured by Gretag-Macbeth AG), and the relict optical density (ROD) was determined by the following formula.

$$ROD(\%) = (D/D_0) \times 100$$

D: OD after exposure test
$D_0$: OD before exposure test (Measurement conditions: green filter, light source: D50, angular field of view 2°)

By plotting the exposure time on the horizontal axis and the measured ROD on the vertical axis, an approximation curve of fading of the printed matter was determined. By the approximation formula obtained thereby, the time until the ROD would fall to 70% was determined, and gas resistance (ozone resistance) was evaluated using the following scoring criteria. The results are shown in Tables 4 and 5.

Scoring Criteria
A: ROD does not decrease to 70% until 24 hours have elapsed.
B: Decrease of ROD to 70% occurs in >20 hours but ≦24 hours.
C: Decrease of ROD to 70% occurs in >16 hours but ≦20 hours.
D: Decrease of ROD to 70% occurs in >12 hours but ≦16 hours.
E: Decrease of ROD to 70% occurs in >8 hours but ≦12 hours.
F: Decrease of ROD to 70% occurs in ≦8 hours.

Moisture Resistance Test

Solid font and outline font printing were performed using the cartridges filled with the ink compositions under ejection conditions so that the ink weight was 1.5 to 2.2 mg/in². Two samples of printed matter were prepared for each ink composition, and after the samples were dried for 24 hours at 25° C. and 40% RH, they were let stand at 40° C. and 85% RH for 4 and 7 days, respectively. The seepage of colorant (breakdown of outline font) was observed visually, and evaluated in accordance with the following scoring criteria. The results are shown in Tables 4 and 5.

Scoring Criteria
A: Almost no seepage of colorant was observed.
B: Slight seepage of colorant was observed, and there were a few breaks in the sharp edges of printed letters.
C: Seepage of colorant was visible, and there were obvious breaks in the sharp edges of printed letters.
D: Seepage of colorant was visible, solid font printed letters grew fatter and outline font printed letters became tinted throughout.
E: Pronounced seepage of colorant was visible, and both solid and outline font printed letters were unreadable.

Foaming Properties Test

The foaming properties of the ink compositions, i.e., foam formation (foamability) and foam disappearance (defoamability) were evaluated in accordance with the following test method both visually and by time-course measurements of foam height.

More specifically, under normal room temperature of 23 to 24° C., 10 g of ink compositions from Examples 1 to 32 and Comparative Examples 1 to 12 were placed in a conical glass container 2 cm in diameter and 10 cm high. The composition was shaken and mixed by hand 50 times, and the height (H) of the bubbles formed at that time from the surface of the liquid to the maximum height of the foam was measured to evaluate foamability. Then the composition was let stand, and the time required for the height (H) measured at its maximum to reach 0.5H, (½ maximum height) was measured to evaluate defoamability.

Scoring Criteria

Foamability Criteria
A: Foam height <2 cm
B: Foam height ≧2 cm but <4 cm
C: Foam height ≧4 cm but <6 cm
D: Foam height ≧6 cm but <8 cm
E: Foam height ≧8 cm Defoamability Criteria
A: <5 min
B: ≧5 min but <10 min
C: ≧10 min but <15 min
D: ≧15 min but <20 min
E: ≧20 min but <25 min
F: ≧25 min

TABLE 4

| | EXAMPLE NO. | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| LIGHT RESISTANCE | D | D | C | B | A | B | B | C | B | B | B | B | B | B | A | A |
| GAS RESISTANCE (OZONE RESISTANCE) | D | D | D | D | D | D | C | D | C | C | C | C | C | C | B | B |
| MOISTURE RESISTANCE (4 DAYS EXPOSURE) | A | A | B | B | C | B | A | B | A | A | A | A | A | A | B | B |
| MOISTURE RESISTANCE (7 DAYS EXPOSURE) | B | B | C | C | D | C | B | B | B | B | B | A | B | B | C | C |
| FOAMABILITY | B | B | B | B | B | B | E | B | C | C | B | E | D | C | E | B |
| DEFOAMABILITY | A | A | A | A | A | A | F | A | B | B | A | F | C | B | F | A |

| | EXAMPLE NO. | | | | | | | | | | | | | | | |
|---|---|---|---|---|---|---|---|---|---|---|---|---|---|---|---|---|
| | 17 | 18 | 19 | 20 | 21 | 22 | 23 | 24 | 25 | 26 | 27 | 28 | 29 | 30 | 31 | 32 |
| LIGHT RESISTANCE | C | C | B | A | A | A | A | B | A | A | A | A | A | A | A | A |
| GAS RESISTANCE (OZONE RESISTANCE) | D | D | D | D | D | D | C | D | C | C | C | C | C | C | B | B |
| MOISTURE RESISTANCE (4 DAYS EXPOSURE) | A | A | B | B | C | B | A | B | A | A | A | A | A | A | B | B |
| MOISTURE RESISTANCE (7 DAYS EXPOSURE) | B | B | C | C | D | C | B | B | B | B | B | A | B | B | C | C |
| FOAMABILITY | B | B | B | B | B | B | E | B | C | C | B | E | D | C | E | B |
| DEFOAMABILITY | A | A | A | A | A | A | F | A | B | B | A | F | C | B | F | A |

TABLE 5

|  | COMPARATIVE EXAMPLE NO. | | | | | | | | | | | |
| --- | --- | --- | --- | --- | --- | --- | --- | --- | --- | --- | --- | --- |
|  | 1 | 2 | 3 | 4 | 5 | 6 | 7 | 8 | 9 | 10 | 11 | 12 |
| LIGHT RESISTANCE | B | A | E | F | F | F | B | A | B | F | F | F |
| GAS RESISTANCE (OZONE RESISTANCE) | E | D | D | F | F | F | E | D | E | F | E | E |
| MOISTURE RESISTANCE (4 DAYS EXPOSURE) | E | E | A | E | E | E | E | E | A | E | E | E |
| MOISTURE RESISTANCE (7 DAYS EXPOSURE) | E | E | A | E | E | E | E | E | A | E | E | E |
| FOAMABILITY | B | B | B | B | B | B | B | B | B | B | B | B |
| DEFOAMABILITY | A | A | A | A | A | A | A | A | A | A | A | A |

As can be seen from Table 2, it is clear that the ink compositions of the present invention (ink compositions of Examples 1 to 32) have better balance in the various evaluation parameters and can guarantee the properties thereof in comparison to previous ink compositions (ink compositions of Comparative Examples 1 to 12).

What is claimed is:

1. A magenta ink composition used as a colorant, containing at least one type of compound represented by Formula (I) below and at least one type of compound represented by Formula (II) below:

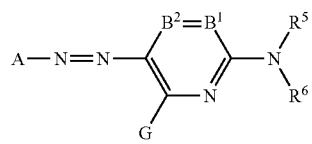

(I)

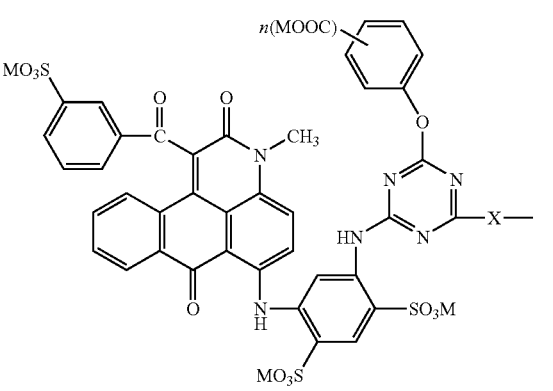

wherein A represents the residue of the five member heterocyclic diazo moiety A-$NH_2$; $B^1$ and $B^2$ represent —$CR^1$= and —$CR^2$=, or one represents a nitrogen atom, and the other represents —$CR^1$= or —$CR^2$=; $R^5$ and $R^6$ each independently represents a hydrogen atom, aliphatic group, aromatic group, heterocyclic group, acyl group, alkoxy carbonyl group, aryloxy carbonyl group, carbamoyl group, alkyl sulfonyl group, aryl sulfonyl group, or sulfamoyl group, each group therein being optionally substituted; G, $R^1$ and $R^2$ each independently represents a hydrogen atom, halogen atom, aliphatic group, aromatic group, heterocyclic group, cyano group, carboxyl group, carbamoyl group, alkoxycarbonyl group, aryloxy carbonyl group, acyl group, hydroxyl group, alkoxy group, aryloxy group, silyloxy group, acyloxy group, carbamoyloxy group, heterooxy group, alkoxycarbonyloxy group, aryloxycarbonyloxy group, amino group substituted with an alkyl group or aryl group or heterocyclic group, acylamino group, ureide group, sulfamoylamino group, alkoxycarbonylamino group, aryloxycarbonylamino group, alkyl and aryl sulphonylamino group, aryloxycarbonylamino group, nitro group, alkyl and aryl thio group, alkyl and aryl sulfonyl group, alkyl and aryl sulfinyl group, sulfamoyl group, sulfo group, or heterothio group, each group therein being optionally substituted; and $R^1$ and $R^5$, or $R^5$ and $R^6$ may optionally bond together to form a 5 or 6 member ring;

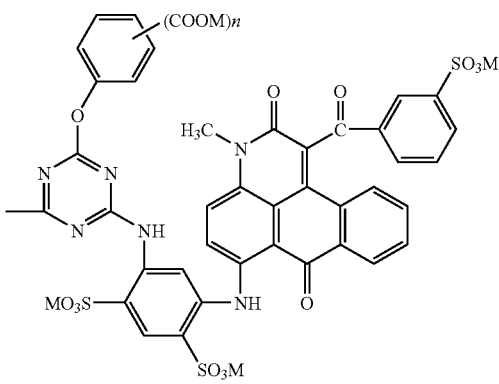

wherein M represents a hydrogen atom, ammonium group, or alkali metal atom; X represents a diaminoalkylene group; and n represents either 1 or 2.

2. The magenta ink composition according to claim 1, wherein the compound represented by Formula (I) is the compound represented by Formula (III) below:

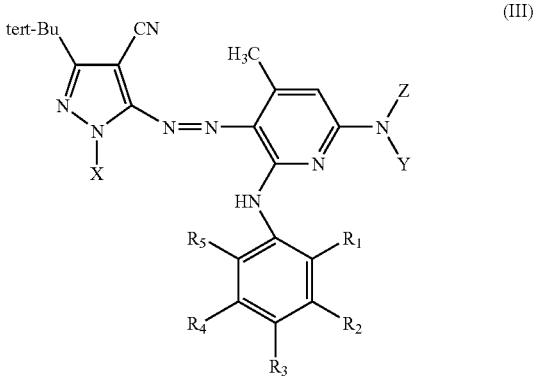

(III)

wherein $R_1$ to $R_5$ represent a hydrogen atom, alkyl group, or a sulfo group or salt thereof; and independently $R_1$ and $R_5$ may be optionally substituted provided both are alkyl groups and the total number of carbon atoms constituting those alkyl groups is 3 or more.

3. The magenta ink composition according to claim 2, wherein the compound represented by Formula (III) is the compound represented by Formula (IV) below:

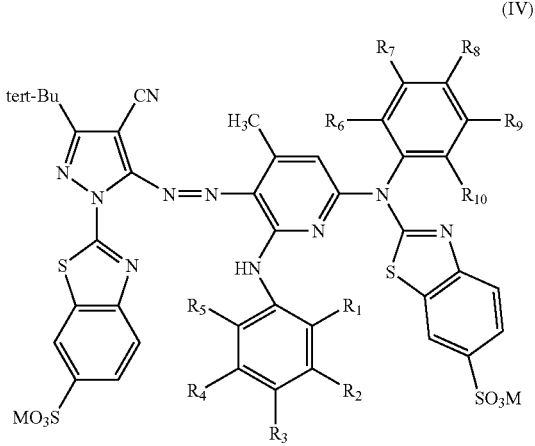

(IV)

wherein $R_1$ to $R_{10}$ represent a hydrogen atom, alkyl group, or a sulfo group or salt thereof; independently ($R_1$ and $R_5$) and ($R_6$ and $R_{10}$) may be optionally substituted provided both are alkyl groups and the total number of carbon atoms constituting those alkyl groups is 3 or more; and M represents a hydrogen atom or alkaline metal atom.

4. The magenta ink composition according to claim 1, wherein the value of n in Formula (II) is 2.

5. The magenta ink composition according to claim 1 containing therein 0.2 to 2.5 wt % of at least one type of compound represented by Formula (I) and 0.4 to 7.0 wt % of at least one type of compound represented by Formula (II), with respect to the total weight of the ink composition.

6. The magenta ink composition according to claim 1, wherein the total weight of colorant solids is 0.6 to 8.0 wt % with respect to the total weight of the ink composition.

7. The magenta ink composition according to claim 1, wherein the content ratio of the compound represented by Formula (I) to the compound represented by Formula (II) lies within the range of 2:1 to 1:8 by weight.

8. The magenta ink composition according to claim 1 containing therein a betaine surfactant represented by Formula (V) below:

wherein R represents a hydrogen atom, alkyl group, aryl group, or heterocyclic group; L represents a linking group with a valence of 2 or more; M represents a hydrogen atom, alkali metal atom, ammonium group, protonated organic amine or nitrogen-containing heterocyclic group, or a quaternary ammonium ion group, and if serving as a counter ion of an ammonium ion comprising atom N in Formula (V), it represents a group that does not serve as the cation thereof; q represents an integer of 1 or more, and r represents an integer of 1 or more but no greater than 4; p represents an integer of 0 or more but no greater than 4, and p+r is either 3 or 4; if p+r is 4, N is a nitrogen atom constituting a quaternary amine; and when p is 2 or more, R may be either the same or different; when q is 2 or more, COOM may be either the same or different; and when r is 2 or more, L-(COOM)$_q$ may be the same or different.

9. The magenta ink composition according to claim 8, wherein the betaine surfactant represented by Formula (V) is the compound represented by Formula (VI) below:

(VI)

wherein $R_1$ to $R_3$ each represent an alkyl group of 1 to 20 carbons; and X represents a linking group with a valence of 2.

10. The magenta ink composition according to claim 9 wherein the compound represented by Formula (VI) is the compound represented by Formula (VII) below:

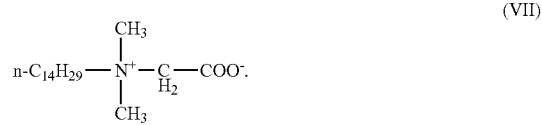

(VII)

11. The magenta ink composition according to claim 8, wherein the content ratio of the compound represented by Formula (I) to the betaine surfactant represented by Formula (V) lies within the range of 1:3 to 3:1 by weight.

12. The magenta ink composition according to claims 8 containing therein a defoaming agent.

13. The magenta ink composition according to claim 12, wherein the defoaming agent is an aliphatic diol compound of 4 to 6 carbons with a hydroxyl number of 1 to 2.

14. The magenta ink composition according to claim 13, wherein the defoaming agent is a diacetylene tetraol compound.

15. The magenta ink composition according to claim 12, wherein the content ratio of the defoaming agent to the betaine surfactant represented by Formula (V) lies within the range of 1:10 to 4:1 by weight.

16. The magenta ink composition according to claim 1 containing therein at least one aromatic compound or salt thereof having a carboxyl group.

17. The magenta ink composition according to claim 16, wherein the aromatic compound or salt thereof containing a carboxyl group is a compound having a naphthalene skeleton or salt thereof.

18. The magenta ink composition according to claim 16, wherein the content ratio of the compound represented by Formula (1), to the aromatic compound or salt thereof having a carboxyl group, lies within the range of 5:1 to 1:3 by weight.

19. The magenta ink composition according to claim 1 further containing a urea derivative.

20. The magenta ink composition according to claim 19, wherein the urea derivative is one type or a mixture of two or more types selected from a group consisting of urea, allylurea, dimethylolurea, malonylurea, carbamylurea, n-butylurea, dibutylurea, N,N-dimethylurea, 1,3-dimethylurea, N-methylurea, hydroxyurea, ethylurea, methylurea, creatinine, 2-imidazolidinone, benzylurea, (R)-(+)-1-phenylethyl urea, phenylurea, 3-hydroxyphenylurea, 1-phenyl semicarbazide, 4-phenyl semicarbazide, N-benzoylurea, and N,N'—O-phenylurea.

21. The magenta ink composition according to claim 19 containing therein 0.5 to 20 wt % urea derivative with respect to the total weight of the ink composition.

22. The magenta ink composition according to claim 19, wherein the content ratio of the total weight of the compound represented by Formula (I) and the compound represented by Formula (II), to the urea derivative lies within the range of 5:1 to 1:100 by weight.

23. The magenta ink composition according to claim 1 containing therein a nonionic surfactant.

24. The magenta ink composition according to claim 23, wherein the nonionic surfactant is an acetylene glycol surfactant.

25. The magenta ink composition according to claim 23 containing therein 0.1 to 5.0 wt % nonionic surfactant with respect to the total weight of the ink composition.

26. The magenta ink composition according to claim 1 containing therein a penetration enhancer.

27. The magenta ink composition according to claim 26, wherein the penetration enhancer is a glycol ether.

28. An ink set for inkjet recording comprising a plurality of ink compositions of different colors, said plurality of ink composition including at least the magenta ink composition according to claim 1.

29. An ink cartridge comprising therein either integrally or independently the ink set according to claim 28.

30. An inkjet recording method comprising the steps of: (a) providing the ink set according to claim 28; and (b) performing recording by ejection of liquid droplets of each of the plurality of ink compositions and depositing the same on a recording medium.

31. Recorded matter printed by the inkjet recording method according to claim 30.

* * * * *